US010307015B1

(12) United States Patent
Shane

(10) Patent No.: US 10,307,015 B1
(45) Date of Patent: Jun. 4, 2019

(54) PROTECTIVE COVER MEMBER

(71) Applicant: Kristi Shane, Califon, NJ (US)

(72) Inventor: Kristi Shane, Califon, NJ (US)

( * ) Notice: Subject to any disclaimer, the term of this patent is extended or adjusted under 35 U.S.C. 154(b) by 189 days.

(21) Appl. No.: 15/442,605

(22) Filed: Feb. 24, 2017

Related U.S. Application Data

(60) Provisional application No. 62/302,097, filed on Mar. 1, 2016.

(51) Int. Cl.
*A47J 36/26* (2006.01)
*A47J 36/24* (2006.01)
*A47J 36/36* (2006.01)

(52) U.S. Cl.
CPC .......... *A47J 36/26* (2013.01); *A47J 36/2405* (2013.01); *A47J 36/36* (2013.01)

(58) Field of Classification Search
CPC .... A47J 36/24; A47J 36/0763; A47J 36/2405; A47J 36/0694; A47J 36/26; A47J 36/34
USPC .......... 99/645, 646 C, 646 R, 449, 337, 483; 126/9 R, 9 A, 9 B, 37 R, 33, 40, 45, 261, 126/377
See application file for complete search history.

(56) References Cited

U.S. PATENT DOCUMENTS

| | | | | | |
|---|---|---|---|---|---|
| 4,838,446 | A * | 6/1989 | Ali | A47J 36/24 | 220/694 |
| 5,263,468 | A * | 11/1993 | Powell | A61F 7/00 | 126/204 |
| 5,711,210 | A * | 1/1998 | Kaufman | A47J 27/10 | 126/9 R |
| 5,819,640 | A * | 10/1998 | Cuomo | A47J 27/10 | 99/483 |
| 5,881,637 | A * | 3/1999 | Strickel | A47J 36/2405 | 126/9 R |
| 8,360,049 | B2 * | 1/2013 | Stephens | E04H 15/003 | 126/30 |

* cited by examiner

*Primary Examiner* — Reginald Alexander
(74) *Attorney, Agent, or Firm* — Bruce A Lev

(57) ABSTRACT

A protective cover member is a four-walled shield which would serve as a wind blocker, preventing gusts of wind from extinguishing Sternos heaters which are heating a chafing dish. At the same time, the protective cover member would keep the Sterno flames contained within the unit, reducing the risk of fire while also allowing for more effective food warming. In addition, convenient handles would permit users to attend to the Sternos without fear of burning their hands.

16 Claims, 4 Drawing Sheets

PROTECTIVE COVER MEMBER

CROSS-REFERENCE TO RELATED APPLICATION

The present application is related to and claims priority from prior provisional application Ser. No. 62/302,097, filed Mar. 1, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field Of The Invention

The present invention relates generally to the field of chafing dish skirts and more specifically relates to a heat and flame-resistant protective assembly that is specially designed for surrounding the heating sternos used by caterers and outdoor chefs to keep food items warm to provide a more efficient means of maintaining sternos, increasing their safety and aesthetic appeal, while also serving as a wind blocker when used outdoors.

2. Description Of The Related Art

When coordinating a large event, such as a wedding reception, company luncheon, or family reunion, many planners rely on professional caterers to prepare and serve food and drink to all who will be attending. In ballrooms, boardrooms, and even backyards, caterers strive to deliver the finest cuisine, creatively presented with relentless attention to detail and personal service. Since catering jobs can range from serving only twenty people to well in the hundreds, it is essential to keep hot, delicious food and cool drink at the ready throughout the course of the event. As such, catering companies maintain an inventory of serving dishes and appliances which are used consistently. Three of the more essential items in the inventory are coolers, chafing dishes, and coffee urns. As the venue for many catered activities is outdoors, many of the chafing dishes and urns rely on the use of sterno or comparable source of fire to heat the contents and to maintain the contents at a warm temperature. These heating devices are fairly long lasting and are placed beneath the bottom of a chafing dish or urn after being lit. A formulation of denatured alcohol, water, and gel, sterno fuel is quite effective and is generally safe when used as directed.

However, sternos can present some challenges to caterers when employed for outdoor events. Particularly, a windy day might necessitate a constant watch on these heat sources. With flame and wind being such unpredictable elements, the mixture of the two could very well create a fire hazard. And quite obviously, gusts of wind are very likely to extinguish sterno flames, resulting in caterers constantly relighting these heat sources in order to maintain the warmth of the food.

Various attempts have been made to solve the above-mentioned problems such as those found in U.S. Pat. No. 5,881,637 to David L. Strickel; U.S. Pat. No. 5,711,210 to Kenneth L. Kaufman; and U.S. Pat. No. 4,838,446 to George Ali. This art is representative of chafing dish skirts. None of the above inventions and patents, taken either singly or in combination, is seen to describe the invention as claimed.

Ideally, chafing dish skirts should provide a heat and flame resistant protective cover and be wind resistant, yet would operate reliably and be manufactured at a modest expense. Thus, a need exists for a reliable protective cover member to avoid the above-mentioned problems.

BRIEF SUMMARY OF THE INVENTION

In view of the foregoing disadvantages inherent in the known chafing dish skirt art, the present invention provides a novel protective cover member. The general purpose of the present invention, which will be described subsequently in greater detail is to provide a heat and flame-resistant protective assembly that is specially designed for surrounding the heating sternos used by caterers and outdoor chefs to keep food items warm to provide a more efficient means of maintaining sternos, increasing their safety and aesthetic appeal, while also serving as a wind blocker when used outdoors.

A protective cover member for use with cooking assemblies is disclosed herein which includes a basket member, a tray member attached to and fitted within the basket member, and canned heat products placed within the basket member and adapted to heat the tray member. The protective cover member further has a panel member formed having a rectangular shape, and a length adapted to wrap around and substantially cover an outer surface area of the side walls of the basket member, and a height adapted to be substantially equal to a height of at least one side wall of the basket member, and adapted to block wind, blowing moisture, and debris from entering a space between the bottom portion of the tray member and a bottom portion of the basket member that would interfere with the heating function of canned heat products. The panel member is formed from an inner flexible layer of heat resistant material and an outer flexible layer of durable material connected to and adapted to protect the inner flexible layer of heat resistant material.

The panel member further has an upper lip member attached to an upper edge of the panel member along the length and is formed from an elastic material, adapted to stretch around and frictionally hold onto the upper edges of the basket member side walls. A releasable connecting member formed as a zipper is attached to end portions of the panel member, to connect the end portions of the panel member, such that the panel member is able to be wrapped around the basket member, and connected to the upper edges of the side walls of the basket member. The protective cover member has at least one air vent aperture covered with heat resistant mesh material adapted to allow a predetermined amount of air to pass into and out of space between the bottom portion of the tray member and the bottom portion of the basket member, and two handle apertures to allow a user to grab the protective cover member via the handle members of the basket member. The protective cover member further has a pocket member attached on it and having at least one cooking mitten formed from a heat resistant material stored therein. The pocket member is further able to hold cooking tools and utensils as needed.

An improved cooking assembly for cooking with canned heat products, comprising a basket member including a bottom portion formed from wire mesh material and at least one side wall formed from wire mesh material connected to the bottom portion and extending upwardly therefrom defining a height and forming an interior volume. A tray member including a bottom wall adapted to be heated by canned heat products and at least one side wall connected to the bottom wall and extends upwardly therefrom and forms an interior volume. The at least one side wall of the tray member includes a lip portion extending outwardly around the top edge and is adapted to contact a top edge of the basket member. The basket member also has an open top portion which allows the tray member to be placed within the interior volume of the basket member such that a space is formed between the bottom portion of the tray member and bottom portion of the basket member. The space is adapted to allow canned heat products to be placed upon the bottom portion of the basket member to heat the bottom wall of the tray member.

The protective cover member further has a panel member formed having a rectangular shape, and a length adapted to wrap around and substantially cover an outer surface area of the side walls of the basket member, and a height adapted to be substantially equal to a height of at least one side wall of the basket member, and adapted to block wind, blowing moisture, and debris from entering a space between the bottom portion of the tray member and a bottom portion of the basket member that would interfere with the heating function of canned heat products. The panel member is formed from an inner flexible layer of heat resistant material and an outer flexible layer of durable material connected to and adapted to protect the inner flexible layer of heat resistant material. The panel member further has an upper lip member attached to an upper edge of the panel member along the length and is formed from an elastic material, adapted to stretch around and frictionally hold onto the upper edges of the basket member side walls. A releasable connecting member formed as a zipper is attached to and between end portions of the length of the panel member, and is adapted to connect the end portions of the length of the panel member, such that the panel member is able to be wrapped around the basket member, and connected to the upper edges of the side walls of the basket member. The protective cover member has at least one air vent aperture covered with heat resistant mesh material there through adapted to allow a predetermined amount of air to pass into and out of space between the bottom portion of the tray member and the bottom portion of the basket member, and two handle apertures to allow a user to grab the protective cover member via the handle members of the basket member. The protective cover further has a pocket member attached on it and having at least one cooking mitten formed from a heat resistant material stored therein. The pocket member is further able to hold cooking tools and utensils as needed.

The present invention holds significant improvements and serves as a protective cover member. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, protective cover member constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a chafing dish skirt and more particularly to a protective cover member as used to improve the ability of a user to provide a heat and flame-resistant protective assembly that is specially designed for surrounding the heating sternos used by caterers and outdoor chefs to keep food items warm to provide a more efficient means of maintaining sternos, increasing their safety and aesthetic appeal, while also serving as a wind blocker when used outdoors.

Generally speaking, a protective cover member is a four-walled shield which would serve as a wind blocker, preventing gusts of wind from extinguishing Sternos heaters which are heating a chafing dish. At the same time, the protective cover system would keep the Sterno flames contained within the unit, reducing the risk of fire while also allowing for more effective food warming. In addition, convenient handles would permit users to attend to the Sternos without fear of burning their hands.

Figure 1:
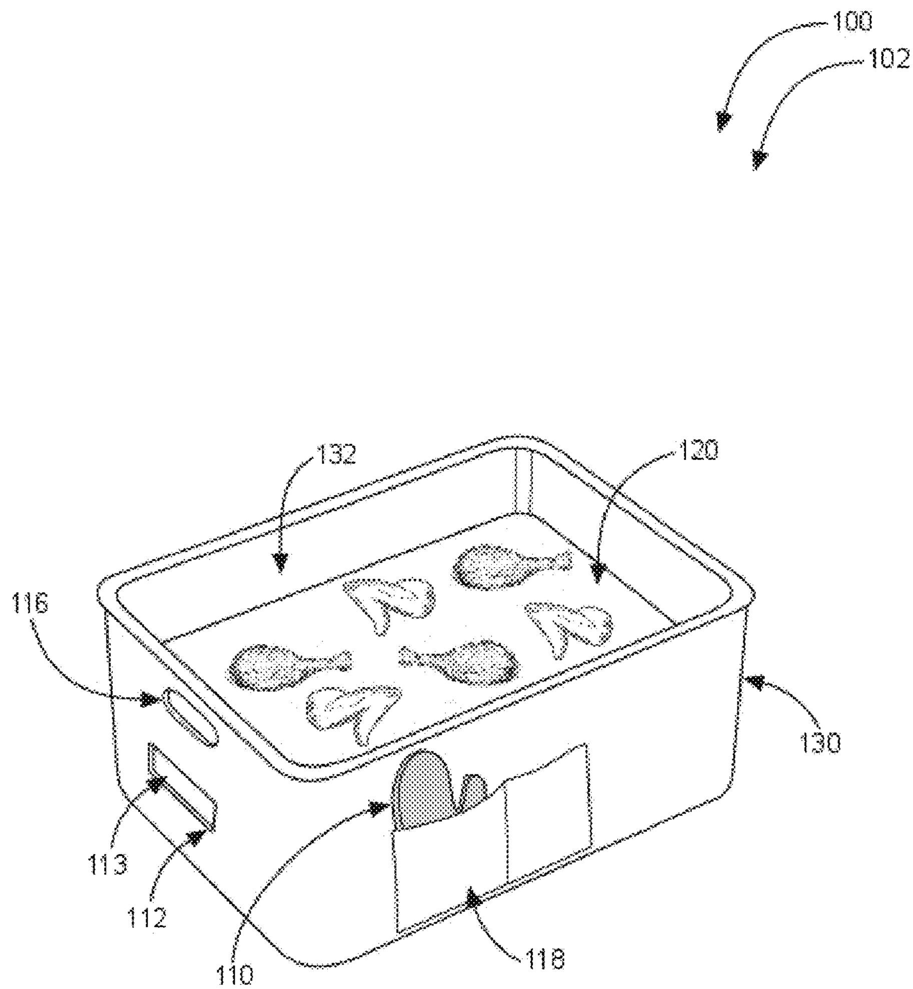
FIG. 1 shows a perspective view illustrating a protective cover member in an in-use condition according to an embodiment of the present invention.

Referring to the drawings by numerals of reference there is shown in FIG. 1, a perspective view illustrating a protective cover member 100 in an in-use condition 102 according to an embodiment of the present invention.

A protective cover member 100 for use with cooking assemblies is disclosed herein which includes basket member 200, tray member 120 attached to and fitted within basket member 200, and canned heat products 170 placed within basket member 200 and adapted to heat tray member 120. Protective cover member 100 further has panel member 130 formed having rectangular shape 132, and a length adapted to wrap around and substantially cover outer surface area of side walls 210 of basket member 200, and a height adapted to be substantially equal to a height of at least one side wall 210 of basket member 200, and adapted to block wind, blowing moisture, and debris from entering a space between bottom portion 122 of tray member 120 and bottom portion 204 of basket member 200 that would interfere with the heating function of canned heat products 170. Panel member 130 is formed from an inner flexible layer 134 of heat resistant material 135 and outer flexible layer 138 of durable of heat resistant material 135 connected to and adapted to protect inner flexible layer 134.

Figure 2:
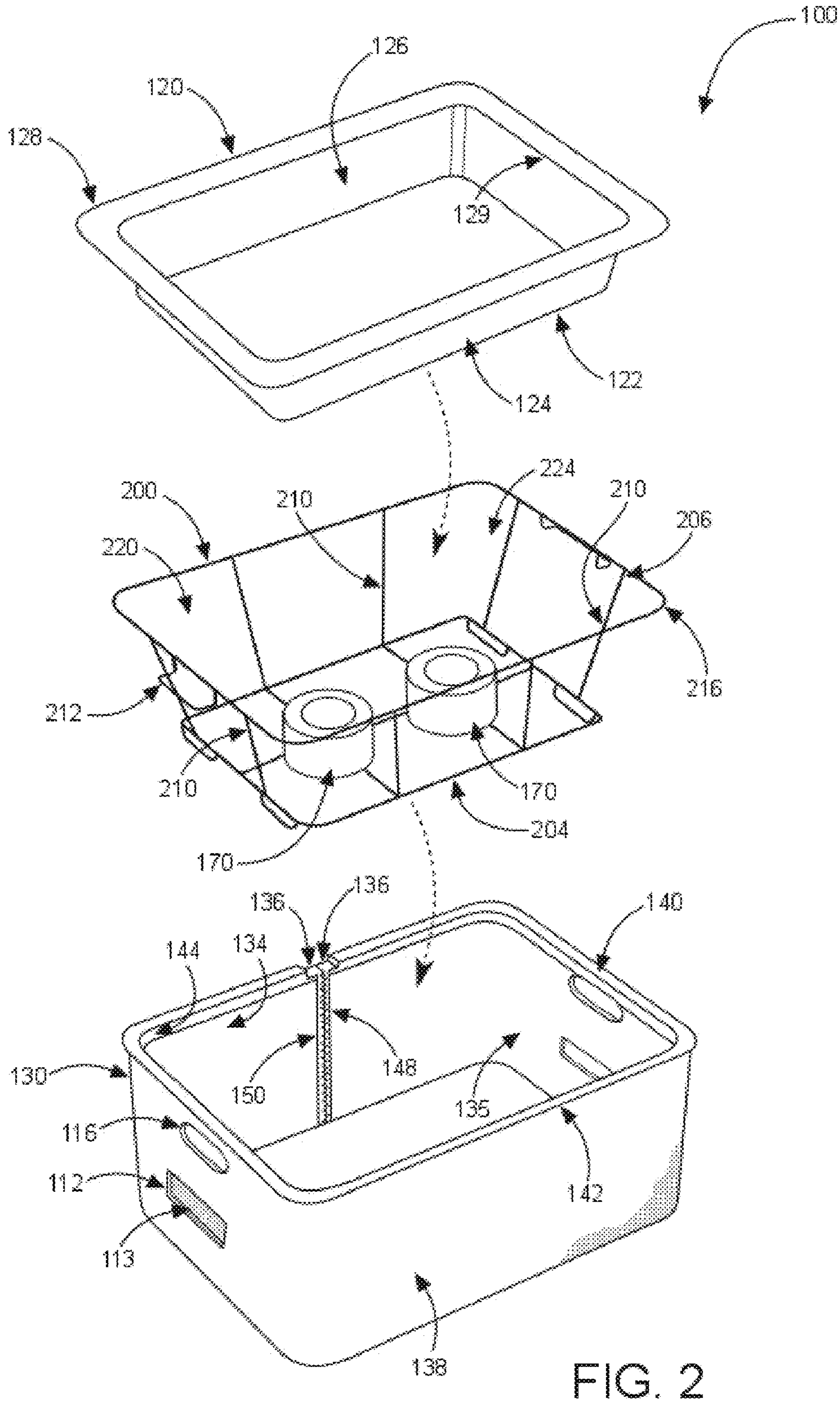
FIG. 2 is an exploded view illustrating a protective cover member according to an embodiment of the present invention of FIG. 1.

Referring now to FIG. 2, an exploded view illustrating a protective cover member 100 according to an embodiment of the present invention.

Panel member 130 further has upper lip member 140 attached to upper edge 142 of panel member 130 along the length and is formed from elastic material 144, adapted to stretch around and frictionally hold onto upper edges 206 of basket member 200 side walls 210. Releasable connecting member 148 formed as zipper 150 is attached to end portions 136 of panel member 130, to connect end portions 136 of panel member 130, such that panel member 130 is able to be wrapped around basket member 200, and connected to upper edges 206 of side walls 210 of basket member 200. Protective cover member 100 has at least one air vent aperture 112 covered with heat resistant mesh material 113 adapted to allow a predetermined amount of air to pass into and out of space between bottom portion 122 of tray member 120 and bottom portion 204 of basket member 200, and two handle apertures 116 to allow a user to grab protective cover member 100 via the handle members 212 of basket member 200. Protective cover member 100 further has pocket member 118 attached to it and having at least one cooking mitten 110 formed from a heat resistant material 113 stored therein. Pocket member 118 is further able to hold cooking tools and utensils as needed.

Figure 3:
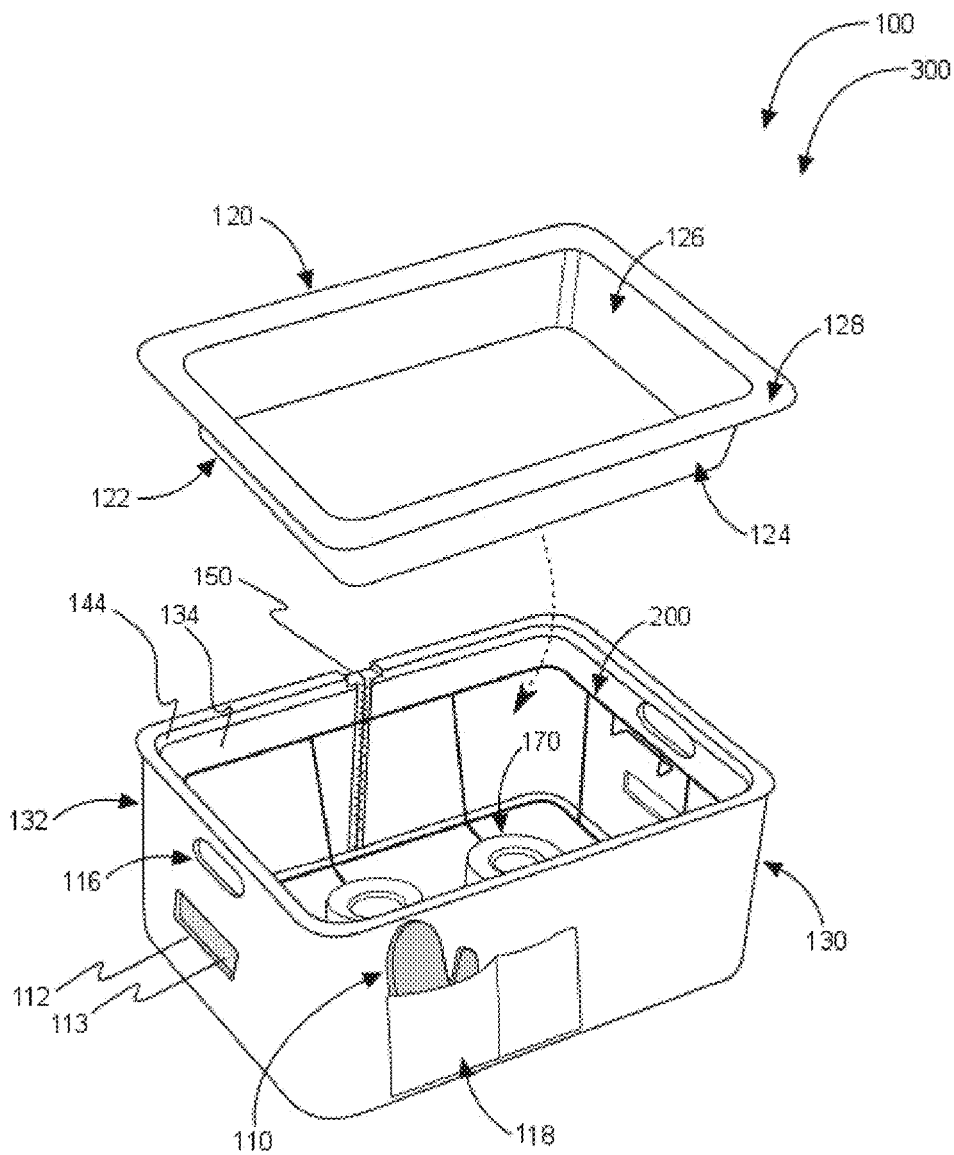
FIG. 3 is a perspective view illustrating a protective cover member with basket member inserted within panel member according to an embodiment of the present invention of FIG. 1.

Referring now to FIG. 3, a perspective view illustrating a protective cover member 100 with basket member 200 inserted within panel member 130 according to an embodiment of the present invention.

Improved cooking assembly 300 for cooking with canned heat products 170, comprising basket member 200 including bottom portion 204 formed from wire mesh material 216 and at least one side wall 210 formed from wire mesh material 216 connected to bottom portion 204 and extending upwardly therefrom defining a height and forming interior volume 220. Tray member 120 including bottom portion 122 adapted to be heated by canned heat products 170 and at least one side wall 124 connected to bottom portion and extends upwardly therefrom and forms interior volume 126. The at least one side wall 124 of tray member 120 includes lip portion 128 extending outwardly around top edge 129 and is adapted to contact upper edges 206 of basket member 200. Basket member 200 has open top portion 224 which allows tray member 120 to be placed within interior volume 220 of basket member 200 such that a space is formed between bottom portion 122 of tray member 120 and bottom portion 204 of basket member 200. The space is adapted to allow canned heat products 170 to be placed upon bottom portion 204 of the basket member 200 to heat bottom portion 122 of tray member 120.

Figure 4:
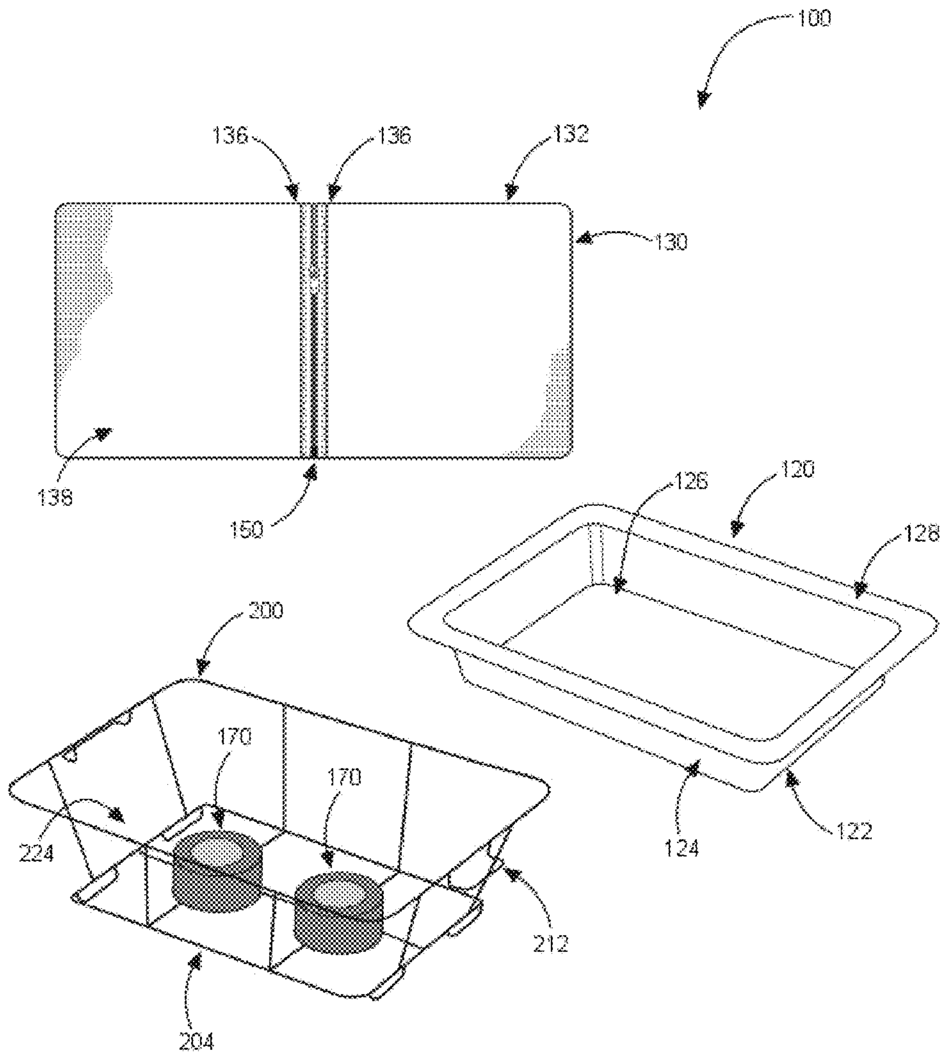
FIG. 4 is a side view illustrating a protective cover member with tray member and basket member removed according to an embodiment of the present invention of FIG. 1.

Referring now to FIG. 4, is a side view illustrating a protective cover member 100 with tray member 120 and basket member 200 removed according to an embodiment of the present invention.

Protective cover member 100 further has panel member 130 formed having rectangular shape 132, and a length adapted to wrap around and substantially cover outer surface area of side walls 210 of basket member 200, and a height adapted to be substantially equal to a height of at least one side wall 210 of basket member 200, and adapted to block wind, blowing moisture, and debris from entering a space between bottom portion 122 of tray member 120 and bottom portion 204 of basket member 200 that would interfere with the heating function of canned heat products 170. Panel member 130 is formed from an inner flexible layer 134 of heat resistant material and outer flexible layer 138 of durable material connected to and adapted to protect inner flexible layer 134 of heat resistant material. Panel member 130 further has upper lip member 140 attached to upper edge 142 of panel member 130 along the length and is formed from elastic material 144, adapted to stretch around and frictionally hold onto upper edges 206 of basket member 200 side walls 210. Releasable connecting member 148 formed as zipper 150 is attached to end portions 136 of panel member 130, to connect end portions 136 of panel member 130, such that panel member 130 is able to be wrapped around basket member 200, and connected to upper edges 206 of side walls 210 of basket member 200. Protective cover member 100 has at least one air vent aperture 112 covered with heat resistant mesh material 113 adapted to allow a predetermined amount of air to pass into and out of space between bottom portion 122 of tray member 120 and bottom portion 204 of basket member 200, and two handle apertures 116 to allow a user to grab protective cover member 100 via the handle members 212 of basket member 200. Protective cover member 100 further has pocket member 118 attached to it and having at least one cooking mitten 110 formed from heat resistant material 113 stored therein. Pocket member 118 is further able to hold cooking tools and utensils as needed.

Protective cover member 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A protective cover member for use with cooking assemblies that include a basket member, a tray member attached to and fitted within said basket member, and canned heat products placed within said basket member and adapted to heat said tray member; said protective cover member comprising:

a panel member;

wherein said panel member is formed having a rectangular shape having a length adapted to wrap around and substantially cover an outer surface area of side walls of said basket member, and a height adapted to be substantially equal to a height of said at least one side wall of said basket member, to thereby be adapted to block wind, blowing moisture, and debris from entering a space between a bottom portion of said tray member and a bottom portion of said basket member and interfering with the heating function of said canned heat products; and wherein said panel member is formed from an inner flexible layer of heat resistant material and an outer flexible layer of durable material connected to and adapted to protect said inner flexible layer of heat resistant material;

an upper lip member;

wherein said upper lip member is attached to an upper edge of said panel member substantially along the length thereof and is adapted to releasably connect to upper edges of said side walls of said basket member substantially along the length thereof; and a releasable connecting member;

wherein said releasable connecting member is attached to and between end portions of said length of said panel member;

wherein releasable connecting member is adapted to releasably connect said end portions of said length of said panel member, such that said panel member is adapted to be wrapped around said basket member, adapted to be releasably connected to said upper edges of said side walls of said basket member, and adapted to be held in place by connecting said end portions of said length of said panel member via said releasable connecting member;

wherein said panel member includes at least one air vent aperture there through adapted to allow a predetermined amount of air to pass into and out of said space between said bottom portion of said tray member and said bottom portion of said basket member; and wherein said panel member further includes heat resistant mesh material attached thereto and covering said at least one air vent aperture.

2. The protective cover member of claim 1, wherein said upper lip member is formed from an elastic material and is adapted to stretch around and releasably and frictionally hold onto said upper edges of said side walls of said basket member.

3. The protective cover member of claim 1, wherein said releasable connecting member is formed as a zipper.

4. The protective cover member of claim 1, wherein said releasable connecting member is formed as hook and loop material.

5. The protective cover member of claim 1, wherein said protective cover member further comprises two handle apertures there through adapted to allow handle members of said basket member to pass through and be accessible by a user to grab the covered and protected cooking assembly via said handle members of said basket member.

6. The protective cover member of claim 1, further comprising a pocket member attached to an outer surface of said outer flexible layer of durable material and adapted to hold cooking tools and utensils therein.

7. The protective cover member of claim 6, further comprising at least one cooking mitten adapted to be stored within said pocket member.

8. The protective cover member of claim 7, wherein said at least one cooking mitten is formed from a heat resistant material; and includes silicone material on a gripping side thereof.

9. The protective cover member of claim 6, further comprising at least one can opener adapted to be stored within said pocket member.

10. An improved cooking assembly for cooking with canned heat products, comprising:

a basket member including:

a bottom portion;

wherein said bottom portion is formed from wire mesh material; and at least one side wall;

wherein said at least one side wall is formed from wire mesh material connected to said bottom portion and extending upwardly therefrom defining a height and forming an interior volume thereof;

an tray member including;

a bottom wall;

wherein said bottom wall is adapted to be heated by canned heat products; and at least one side wall;

wherein said at least one side wall is connected to said bottom wall and extends upwardly therefrom and forms an interior volume thereof; and wherein said at least one side wall includes a lip portion extending outwardly therefrom and substantially around a top edge thereof and is adapted to contact to a top edge of said at least one side wall of said basket member; and an open top portion;

wherein said tray member is adapted to be placed within said interior volume of said basket member such that a space is formed between said bottom portion of said tray member and said bottom portion of said basket member; and wherein said space is adapted to allow canned heat products to be placed upon said bottom portion of said basket member and to be used therein;

at least one canned heat member;

wherein said at least one canned heat member is adapted to be placed upon said bottom portion of said basket member within said space formed between said bottom portion of said tray member and said bottom portion of said basket member and is adapted to heat said bottom wall of said tray member; and a protective cover member comprising:

a panel member;

wherein said panel member is formed having a rectangular shape having a length adapted to wrap around and substantially cover an outer surface area of said at least one side wall of said basket member, and a height substantially equal to said height of said at least one side wall of said basket member to thereby be adapted to block wind, blowing moisture, and debris from entering said space formed between said bottom portion of said tray member and said bottom portion of said basket member and interfering with the heating function of said at least one canned heat member; and wherein said panel member is formed from an inner flexible layer of heat resistant material and an outer flexible layer of durable material connected to and adapted to protect said inner flexible layer of heat resistant material;

an upper lip member;

wherein said upper lip member is attached to an upper edge of said panel member substantially along the length thereof and is adapted to releasably connect to an upper edge of said at least one side wall of said basket member substantially along the length thereof; and a releasable connecting member;

wherein said releasable connecting member is attached to and between end portions of said length of said panel member;

wherein releasable connecting member is adapted to releasably connect said end portions of said length of said panel member, such that said panel member can be wrapped around said basket member, releasably connected to said upper edge of said at least one side wall of said basket member, and held in place by connecting said end portions of said length of said panel member via said releasable connecting member;

wherein said panel member includes at least one air vent aperture there through adapted to allow a predetermined amount of air to pass into and out of said space between said bottom portion of said tray member and said bottom portion of said basket member; and wherein said panel member further includes heat resistant mesh material attached thereto and covering said at least one air vent aperture.

11. The improved cooking assembly of claim 10, wherein said upper lip member is formed from an elastic material and is adapted to stretch around and releasably and frictionally hold onto said upper edges of said side walls of said basket member.

12. The improved cooking assembly of claim 10, wherein said releasable connecting member is formed as a zipper.

13. The improved cooking assembly of claim 10, wherein said releasable connecting member is formed as hook and loop material.

14. The protective cover member of claim 10, wherein said protective cover member further comprises two handle apertures there through adapted to allow handle members of said basket member to pass through and be accessible by a user to grab the covered and protected cooking assembly via said handle members of said basket member.

15. The protective cover member of claim 10, further comprising a pocket member attached to an outer surface of said outer flexible layer of durable material and adapted to hold cooking tools and utensils therein.

16. The protective cover member of claim 15, further comprising at least one cooking mitten adapted to be stored within said pocket member and formed from a heat resistant material, and includes silicone material on a gripping side thereof; and further comprising at least one can opener adapted to be stored within said pocket member.

* * * * *